US011959045B2

(12) United States Patent
Guo et al.

(10) Patent No.: US 11,959,045 B2
(45) Date of Patent: Apr. 16, 2024

(54) ORGANIC ACID BASED ANTIMICROBIAL FORMULATIONS CONTAINING EXTREMELY LOW LEVELS OF SURFACTANT

(71) Applicant: THE CLOROX COMPANY, Oakland, CA (US)

(72) Inventors: Xuanrong Guo, Pleasanton, CA (US); Barbara Ekerdt, Pleasanton, CA (US); David R. Scheuing, Danville, CA (US); Nancy A. Falk, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 165 days.

(21) Appl. No.: 17/406,341

(22) Filed: Aug. 19, 2021

(65) Prior Publication Data

US 2022/0056374 A1 Feb. 24, 2022

Related U.S. Application Data

(60) Provisional application No. 63/068,706, filed on Aug. 21, 2020.

(51) Int. Cl.

| | |
|---|---|
| ***C11D 7/50*** | (2006.01) |
| ***C11D 1/14*** | (2006.01) |
| ***C11D 1/83*** | (2006.01) |
| ***C11D 3/20*** | (2006.01) |
| ***C11D 3/43*** | (2006.01) |
| ***C11D 3/48*** | (2006.01) |
| ***C11D 3/50*** | (2006.01) |
| ***C11D 11/00*** | (2006.01) |
| ***C11D 17/04*** | (2006.01) |
| *C11D 1/22* | (2006.01) |
| *C11D 1/66* | (2006.01) |
| *C11D 1/75* | (2006.01) |

(52) U.S. Cl.

CPC ................ *C11D 1/83* (2013.01); *C11D 1/146* (2013.01); *C11D 3/2044* (2013.01); *C11D 3/2079* (2013.01); *C11D 3/2086* (2013.01); *C11D 3/43* (2013.01); *C11D 3/48* (2013.01); *C11D 3/50* (2013.01); *C11D 11/0023* (2013.01); *C11D 17/049* (2013.01); *C11D 1/143* (2013.01); *C11D 1/22* (2013.01); *C11D 1/662* (2013.01); *C11D 1/75* (2013.01)

(58) Field of Classification Search

CPC ....... C11D 1/146; C11D 1/143; C11D 3/0094; C11D 3/0026; C11D 3/2068; C11D 7/265; C11D 7/50; C11D 7/5004; C11D 7/5086; C11D 11/0023; C11D 17/049

See application file for complete search history.

(56) References Cited

U.S. PATENT DOCUMENTS

| | | | | |
|---|---|---|---|---|
| 4,615,937 | A | 10/1986 | Bouchette | |
| 4,666,621 | A | 5/1987 | Clark et al. | |
| 4,781,974 | A | 11/1988 | Bouchette et al. | |
| 4,931,271 | A | 6/1990 | Lang et al. | |
| 4,957,908 | A | 9/1990 | Nelson | |
| 5,419,908 | A | 5/1995 | Richter et al. | |
| 5,436,008 | A * | 7/1995 | Richter .................. | C11D 7/266 424/405 |
| 5,908,707 | A | 6/1999 | Cabell et al. | |
| 6,221,823 | B1 | 4/2001 | Crisanti et al. | |
| 6,262,038 | B1 | 7/2001 | Pierce et al. | |
| 6,699,825 | B2 | 3/2004 | Rees et al. | |
| 7,319,112 | B2 | 1/2008 | Haught et al. | |
| 7,696,109 | B2 | 4/2010 | Quellette et al. | |
| 7,696,143 | B2 | 4/2010 | McCue et al. | |
| 8,268,334 | B2 | 9/2012 | Dreilinger et al. | |
| 8,993,505 | B2 | 3/2015 | Scheuing et al. | |
| 9,012,389 | B2 | 4/2015 | Scheuing et al. | |

(Continued)

FOREIGN PATENT DOCUMENTS

| | | | |
|---|---|---|---|
| EP | 0750063 | A1 | 12/1996 |
| EP | 992338 | A2 | 12/2000 |

(Continued)

OTHER PUBLICATIONS

Herrera-Marques et al, "Cleaning maps: A multi-length scale stragety to approach the cleaning of complex food deposits," Journal of Cleaner Production, vol. 261, Mar. 25, 2020, 121254.
U.S. Appl. No. 63/068,706, filed Aug. 21, 2020.
Examiner Interview Summary Record (PTOL-413) dated Jun. 20, 2023 for U.S. Appl. No. 17/406,461, 1 page(s).
Notice of Allowance and Fees Due (PTOL-85) dated Jul. 3, 2023 for U.S. Appl. No. 17/406,461, 2 pages.

(Continued)

*Primary Examiner* — Charles I Boyer
(74) *Attorney, Agent, or Firm* — Workman Nydegger

(57) ABSTRACT

The present invention is for an acidic cleaning composition which has excellent cleaning performance, low toxicity and good antimicrobial efficacy. The inventive acidic cleaning compositions are capable of sanitizing or disinfecting a variety of hard surfaces. The inventive acidic cleaning compositions can take a variety of forms, such as: disinfecting wipes, all-purpose disinfecting sprays, kitchen cleaners, bathroom cleaners, toilet cleaners, etc. The compositions may meet EPA DfE requirements, EPA category III or IV requirements, and/or be safe for use on food contact surfaces without rinsing. The compositions may include citric acid, an anionic surfactant, a non-volatile glycol solvent, a fatty acid, and water. The compositions may be free of other sanitizing acids, quaternary ammonium compounds, biguanides, peroxides, hypohalites, etc., and have a pH of less than 2.5. The composition may provide sanitization or disinfection against a target microbe within 5 minutes or less, or 4 minutes or less.

13 Claims, No Drawings

(56) References Cited

U.S. PATENT DOCUMENTS

| | | | | |
|---|---|---|---|---|
| 9,273,220 | B2 | 3/2016 | Scheuing et al. | |
| 9,309,435 | B2 | 4/2016 | Scheuing et al. | |
| 9,474,269 | B2 | 10/2016 | Scheuing et al. | |
| 9,486,800 | B2 | 11/2016 | Scheuing et al. | |
| 9,593,299 | B2 | 3/2017 | Scheuing et al. | |
| 9,663,747 | B2 | 5/2017 | Scheuing et al. | |
| 9,796,872 | B2 | 10/2017 | Scheuing et al. | |
| 9,809,790 | B2 | 11/2017 | Scheuing et al. | |
| 9,976,109 | B2 | 5/2018 | Scheuing et al. | |
| 10,066,196 | B2 | 9/2018 | Scheuing et al. | |
| 10,208,275 | B2 | 2/2019 | Scheuing et al. | |
| 10,400,131 | B2 | 9/2019 | Scheuing et al. | |
| 10,563,156 | B2 | 2/2020 | Scheuing et al. | |
| 11,753,603 | B2 | 9/2023 | Falk et al. | |
| 2002/0155969 | A1 | 10/2002 | Rees et al. | |
| 2003/0083219 | A1 | 5/2003 | Rees et al. | |
| 2004/0157524 | A1 | 8/2004 | Polat et al. | |
| 2006/0100128 | A1 | 5/2006 | McCue et al. | |
| 2006/0223735 | A1 | 10/2006 | Gaudreault | |
| 2006/0293201 | A1 | 12/2006 | Simon et al. | |
| 2010/0240752 | A1 | 9/2010 | Dreilinger et al. | |
| 2011/0009309 | A1* | 1/2011 | Mertens | C11D 3/3796 510/400 |
| 2011/0180101 | A1* | 7/2011 | Konishi | C11D 3/3956 510/238 |
| 2013/0157921 | A1 | 6/2013 | Marin et al. | |
| 2016/0058005 | A1 | 3/2016 | Hazenkamp et al. | |
| 2016/0058012 | A1 | 3/2016 | Herdt et al. | |
| 2016/0326462 | A1 | 11/2016 | Zhang et al. | |
| 2017/0015960 | A1 | 1/2017 | Boers et al. | |
| 2017/0258079 | A1 | 9/2017 | Kiesel et al. | |
| 2018/0002646 | A1 | 1/2018 | Larson, III et al. | |
| 2018/0027812 | A1 | 2/2018 | Bobbert | |
| 2019/0090483 | A1 | 3/2019 | Li et al. | |
| 2019/0330568 | A1 | 10/2019 | Ceulemans et al. | |
| 2020/0367492 | A1 | 11/2020 | Budhian et al. | |
| 2021/0227830 | A1 | 7/2021 | Herdt et al. | |
| 2022/0056370 | A1 | 2/2022 | Falk et al. | |
| 2023/0365891 | A1 | 11/2023 | Falk et al. | |

FOREIGN PATENT DOCUMENTS

| | | | |
|---|---|---|---|
| EP | 1303661 | A1 | 4/2003 |
| EP | 1687136 | A2 | 8/2006 |
| EP | 1861529 | A1 | 12/2007 |
| NZ | 522970 | A | 5/2004 |
| WO | 96/14835 | A1 | 5/1996 |
| WO | 97/40814 | A1 | 11/1997 |
| WO | 98/03713 | A1 | 1/1998 |
| WO | 01/94513 | A1 | 12/2001 |

OTHER PUBLICATIONS

Notice of Allowance and Fees Due (PTOL-85) dated Jun. 20, 2023 for U.S. Appl. No. 17/406,461, 9 pages.

United States Office Action from corresponding U.S. Appl. No. 17/406,341, filed Jun. 16, 2023.

* cited by examiner

ORGANIC ACID BASED ANTIMICROBIAL FORMULATIONS CONTAINING EXTREMELY LOW LEVELS OF SURFACTANT

CROSS REFERENCE TO RELATED APPLICATIONS

The present application claims the benefit of U.S. Provisional Patent Application Ser. No. 63/068,706, filed on Aug. 21, 2020, the disclosure of which is incorporated by reference in its entirety.

BACKGROUND OF THE INVENTION

1. The Field of the Invention

The present invention relates generally to acidic cleaning compositions, e.g., for use on hard surfaces. The inventive acidic cleaning compositions have a limited number of ingredients that are capable of sanitizing and disinfecting such hard surfaces. The inventive acidic cleaning compositions can take a variety of forms, such as: disinfecting wipes, all-purpose disinfecting sprays, kitchen cleaners, bathroom cleaners, toilet cleaners, etc. The inventive compositions have good cleaning properties and low residue. In addition, at least some embodiments of the present formulations surprisingly achieve relatively fast sanitization or disinfection (e.g., within 5 minutes, or within 4 minutes), while at the same time meeting the U.S. Environmental Protection Agency's (EPA) "Design for the Environment" or "DfE" program. The U.S. EPA's "Safer Choice" program is focused on identifying safer sanitizing and disinfecting active ingredients. DfE is the pesticide portion of the "Safer Choice" program. There is a need for an antimicrobial formulation that will meet DfE requirements, the EPA's Category III or IV requirements, and/or while also being safe for food contact surfaces without rinsing with water, e.g., under 40 CFR 180.940(a). Under the EPA's Category III (and IV), no personal protective equipment is required when using the composition. The ability to simultaneously meet such safety and environmentally friendly requirements, while providing sanitization and/or disinfection within a 5 minute, or 4 minute contact time is surprising, and particularly advantageous.

Consumers have access to more information than ever before on the properties of the ingredients used in household cleaning products. This access is clearly driving concerns about the relative safety and effects, both chronic and acute, of ingredients on human health. Thus, there is growing preference for cleaning products which are perceived as safer in use, but can still provide antimicrobial (germicidal) efficacy in cleaning and the sanitization or disinfection of the surfaces cleaned.

The formulations should deliver effective sanitization or disinfection of the surfaces where this germicidal performance is evaluated by protocols acceptable to a regulatory agency such as the U.S. Environmental Protection Agency (EPA). This means the formulations are tested for efficacy via protocols that include dispensing from the intended container, for example a spray bottle, abrasion of a known, regulated level of microorganisms dried on a surface, and evaluation of the variability of the germicidal effects across multiple replicate contaminated surfaces. For example, a suitable antimicrobial testing protocol could require testing 60 carriers with the formulation, within a regulated time of contact, such as contact times of 10 minutes or less, 5 minutes or less, 4 minutes or less, etc.

The inventive formulations typically use ingredients that are highly preferred, based on published technical criteria set by one or more regulatory agencies concerned with the effects of the cleaning solutions on both consumers and the environment. To date, there is not yet global harmonization on the list of ingredients for sanitizing and disinfecting formulations that are considered preferred for environmental and consumer safety. In the US, however, the EPA has set formula criteria and chemical ingredients which are preferred. In addition, within the US, certain states, such as California, have enacted regulations on the use of certain "volatile organic compounds" (VOCs) in cleaning products, in efforts at reducing environmental impacts of commonly used cleaning products. In some embodiments of the invention, all of the components or substantially all components of the inventive compositions meet the EPA guidelines under 40 CFR 180.940(a), 40 CFR 180.950 and/or 40 CFR 180.960, each of which reflect a presumption of low toxicity. There is a need for efficacious cleaning compositions that deliver effective sanitization or disinfection of the surfaces which are free from less preferred germicidal compounds, including: quaternary ammonium compounds, biguanides, chlorine and peroxide or other oxidants, triclosan, triclocarban, iodine and fluorosurfactants.

2. Description of Related Art

The prior art for acidic cleaners teaches many compositions which are directed to the cleaning of hard water and soap scum or lime scale stains. Many of these are acidic, aqueous compositions which include one or more detersive surfactants. Many of the prior art acid cleaners do not provide a germicidal or sanitizing effect to the hard surfaces being treated. Of the prior art formulations that do provide a sanitizing or disinfecting benefit, it is usually because of the inclusion of one or more antimicrobial constituents, such as known cationic quaternary ammonium compounds. Quaternary ammonium compounds are well known to be effective against gram positive type pathogenic bacteria such as *Staphylococcus aureus*, and/or gram negative type pathogenic bacteria such as *Salmonella choleraesuis* and/or *Pseudomonas aeruginosa*. The inventive compositions are free from antimicrobial constituents including: biguanides, triclosan, triclocarban, quaternary ammonium compounds, ammonia, peroxide, peracetic acid, hypochlorite, or hypochlorous acid, or other hypohalites which formulations tend to have an unpleasant or harsh odor, skin and/or eye irritation (i.e., they do not meet the EPA category IV standard, or perhaps not even the category III standard), and surface compatibility limitations. In general, the inclusion of most antimicrobial constituents is often not without one or more detriments including, but not limited to specific formulation limitations, irritation concerns, inability to also achieve the EPA's DfE standard, the EPA's CAT IV standard, food contact surface safety, or the like.

Quaternary ammonium compounds are commonly used in disinfecting and sanitizing products because of their lower potential to damage surfaces versus hypohalites, yet have broad spectrum antimicrobial efficacy. Unfortunately, demand has surged for these compounds and products containing them during the recent COVID-19 pandemic, and shortages exist for key precursors to these compounds, such as tertiary amines and alkyl benzyl chlorides. The inventive compositions do not use these precursors to obtain broad spectrum antimicrobial efficacy, and thus provide critical additional antimicrobial capacity for bleach-free disinfection and sanitization for healthcare facilities, commercial spaces, and consumer usage on inanimate surfaces in and outside the home.

One aspect of the present invention is to provide sanitizing or disinfecting compositions that do not rely on use of quaternary amine compounds for sanitization or disinfection. For example, some quaternary ammonium compounds may cause skin and eye irritation at low levels and personal protective equipment (PPE) or hand washing after use may therefore be recommended or required. Acid cleaning compositions, which are effective at sanitizing and disinfecting surfaces without the addition of quaternary ammonium compounds, are needed in the field to provide an effective alternative to the prior art products available today. Accordingly, there is a real and continuing need in the art for improved hard surface treatment compositions which provide a cleaning and sanitizing or disinfecting benefit, which do not contain hypohalites, peroxides, or quaternary ammonium compounds. As noted, it would be particularly advantageous if a given formulation could achieve sanitization or disinfection within 5 minutes, or within 4 minutes, while at the same time meeting the EPA's DfE requirements, the EPA's Category III (or IV) requirements (no personal protective equipment is required for use), and/or also being safe for food contact surfaces, e.g., under 40 CFR 180.940(a).

U.S. Pat. No. 6,699,825, by Rees et al., assigned to S.C. Johnson and Son Inc., teaches an acidic hard-surface antimicrobial cleaner with both lactic and glycolic acids. Rees teaches using sparingly soluble glycol ether solvents in the antimicrobial cleaner, but the exemplary glycol ether solvent differs from formulations of the present invention because they do not meet the EPA Volatile Organic Compounds (VOCs) regulation requirements or the California Air Resources Board (CARE) VOC requirements. In addition, the upper end of the solvent level ranges (about 0.5% to 10% by weight) is too high to meet VOC requirements for a ready to use product and the toxicity profile of the solvents is much higher than those of the present invention. Rees' requirement of both lactic and glycolic acids also teaches away from the present invention.

U.S. Pat. No. 8,268,334, by Dreilinger et al., assigned to Reckitt Benckiser LLC, teaches aqueous acidic hard surface cleaning and disinfecting compositions which comprise lactic acid and optionally another organic acid. Dreilinger teaches inventive hard surface cleaning compositions that contain glycol ethers and ethanol at levels that are not acceptable under current U.S. VOCs regulations according to the EPA. In an embodiment, the claimed inventive acidic cleaning composition uses only an extremely low level of an anionic surfactant constituent (e.g., an alkyl sulfate such as sodium lauryl sulfate or a secondary alkane sulfonate), without addition of alkylpolyglucosides, alcohol ethoxylates, or other nonionic surfactants. In some embodiments, the lactic acid or an alkoxylated fatty alcohol surfactant is excluded from the compositions of the present invention.

U.S. Pat. No. 7,696,143, by McCue et al., assigned to Reckitt Benckiser LLC, teaches acidic hard surface cleaners which comprise organic acids, anionic surfactants and nonionic surfactants and solvents. McCue teaches that his inventive hard surface cleaning compositions contain ethanol at levels that are not acceptable under current U.S. VOCs regulations according to the EPA. McCue teaches that the essential ingredients of his compositions include an anionic surfactant and a range of nonionic surfactants containing ethylene oxide groups, or alkoxy block copolymers, or certain nonionic surfactants containing ethoxy, propoxy and/or butoxy groups. The present invention does not require a nonionic surfactant. In some embodiments of the present invention the acidic cleaning composition is free of a nonionic surfactant containing ethylene oxide groups or alkoxy block copolymers, or certain nonionic surfactants containing ethoxy, propoxy and/or butoxy groups. For example, the present cleaning composition may include only an anionic surfactant, at very low levels (e.g., less than 0.1% by weight).

U.S. Pat. No. 5,419,908, by Richter et al., assigned to Ecolab Inc., teaches a sanitizing composition which requires a blend of aromatic polyunsaturated carboxylic acids. Richter's inventive compositions require a blend of acids such as sorbic acid and benzoic acid. In some embodiments, Richter requires more than two organic acids. In addition, Richter's inventive compositions require a nonionic surfactant such as polyoxyethylene or polyoxypropylene copolymer, which are inconsistent with the objectives of the present invention as being safe for use on food contact surfaces. In some embodiments of the present invention the acidic cleaning composition is free of a nonionic surfactant containing polyoxyethylene or a polyoxypropylene copolymer. Richter teaches that his inventive hard surface cleaning compositions contain ethanol at levels that are not acceptable under current U.S. VOCs regulations according to the EPA.

U.S. Pat. No. 6,262,038, by Pierce et al., assigned to Christal David Ltd., teaches a germicidal composition which requires a blend of aromatic polyunsaturated carboxylic acids. Richter's inventive compositions require a blend of acids such as lactic, glycolic, citric, malic and tartaric acids. Pierce's germicidal composition requires the inclusion of a sophorose lipid biosurfactant in an amount of 0.1-2.0% by weight of the composition. The present invention does not require a combination or blend of carboxylic acids, nor does it require aromatic polyunsaturated carboxylic acids. In addition, the present invention does not require a sophorose lipid biosurfactant. In one embodiment of the invention, the inventive formulation is free of sophorose compounds, such as a sophorose lipid biosurfactant. Pierce's invention is directed to the germicidal cleaning of fruits, vegetables, skin and hair and is not particularly directed to cleaning of hard surfaces.

Prior art compositions do not combine effective cleaning with sanitizing and disinfection while using an acidic active component without other antimicrobial constituents, particularly in a manner that would allow for achieving relatively fast sanitization or disinfection (e.g., within 5 minutes, or within 4 minutes), while at the same time meeting the EPA's DfE requirements, the EPA's Category III (or IV) requirements (no personal protective equipment required for use), and/or safe for food contact surface requirements, e.g., under 40 CFR 180.940(a). The present invention provides an acidic cleaning composition that overcomes at least some of the disadvantages and shortcomings associated with prior art cleaning compositions. At least some embodiments of the present invention provide the ability to simultaneously meet such safety and environmentally friendly requirements, while providing sanitization and/or disinfection within a 5 minute or 4 minute contact time, which results are surprising, and particularly advantageous.

BRIEF SUMMARY

One aspect of the present invention comprises an acidic hard surface cleaning composition comprising: from 0.1% to 5%, such as 0.3% to 2%, or 0.4% to 1.5% by weight of an acid such as citric acid; 0.01% to 1% of an anionic surfactant; from 0.1% to about 5%, or from 0.5% to 4% by weight of a non-volatile glycol solvent (e.g., not a volatile glycol ether), from 0.0001% to 0.1% by weight of a fatty acid, and water. Various optional components, such as one or more pH adjusters, fragrances, dyes, colorants, polymers, defoamers, builders, buffers and/or preservatives may be present. The composition advantageously contains substantially no antimicrobial compounds such as: quaternary ammonium compounds, biguanides, hypohalites or peroxides; and wherein the pH is less than 2.5 (such as from 1 to 2.4, or 1.5 to 2.4). The composition advantageously provides sanitization or disinfection (e.g., at least a 2 log, or at least a 3 log reduction) in a target microbe within 5 minutes or less, or within 4 minutes or less.

Another aspect of the current invention is a concentrated composition that yields the above compositions upon dilution per use instructions.

The inventive compositions have low toxicity and good cleaning performance. For example, the compositions may meet the requirements of the EPA's DfE program, EPA category III or IV requirements, and/or be safe for use on food contact surfaces without rinsing. The inventive acid cleaning compositions are effective at sanitizing or disinfecting surfaces and can be used on a variety of hard surfaces. Furthermore, the cleaning compositions can be used in a variety of different formats, including but not limited to, disinfecting wipes, sanitizing or disinfecting all-purpose spray cleaners, kitchen cleaners, bathroom cleaners, toilet cleaners, shower and bathtub cleaners, etc.

According to one embodiment of the invention, there is provided hard surface treatment compositions which provide a cleaning and sanitizing or disinfecting benefit comprising: an acidic constituent including one or more of citric acid, caprylic acid, or methanesulfonic acid; an anionic surfactant constituent selected from: sulfonate, sulfate, or any mixtures thereof; at least one non-volatile glycol solvent; a fatty acid; and optionally one or more further constituents selected from: polymers, defoamers, dyes and coloring agents, fragrances and fragrance solubilizers, viscosity modifying agents, pH adjusting agents and pH buffers including organic and inorganic salts, antifoaming agents, preservatives, and anti-corrosion agents. In one embodiment, the composition may be free from organic solvents and the composition may contain at least 95% water. The balance (and vast majority) of the composition may be made up of water. The composition may have a pH of less than 2.5, and may provide sanitization and/or disinfection against a target microbe within 5 minutes or less, or 4 minutes or less. In addition to providing relatively fast sanitization or disinfection, the composition may advantageously meet EPA DfE (under the "Safer Choice" program) requirements, EPA categories III or IV requirements (e.g., as detailed in 40 CFR 156.62, herein incorporated by reference), and/or be safe for use on food contact surfaces (e.g., as detailed in 40 CFR 180.940(a)), without rinsing.

In another embodiment of the invention, the inventive acidic cleaning and disinfecting composition comprises, consists essentially of or consists of: citric acid; an anionic surfactant constituent selected from: secondary alkyl sulfonates, alkyl sulfates, a non-volatile glycol solvent, a fatty acid, and water. Optionally, the composition may further include one or more further constituents selected from: pH adjusting agents (e.g., methanesulfonic acid), polymers, defoamers, dyes and coloring agents, fragrances and fragrance solubilizers, thickeners, viscosity modifying agents, pH adjusting agents and pH buffers including organic and inorganic salts, antifoaming agents, preservatives, or anti-corrosion agents. The composition may provide at least a 3 log reduction in *Staphylococcus aureus* or another target microbe within 5 minutes or within 4 minutes, and have a pH from 1 to 2.4. The composition may advantageously meet EPA DfE (under the "Safer Choice" program) requirements, EPA categories III or IV requirements (e.g., as detailed in 40 CFR 156.62, herein incorporated by reference), and/or be safe for use on food contact surfaces (e.g., as detailed in 40 CFR 180.940(a)), without rinsing. The ability to meet such safety standards, while at the same time providing relative fast sanitization or disinfection is particularly advantageous, and surprising.

According to preferred embodiments of the invention, the inventors have surprisingly found that the inclusion of modest amounts of the specific water soluble organic acid(s) (e.g., citric acid) in conjunction with very low concentrations of the specific anionic surfactants at final use concentrations in the largely aqueous compositions surprisingly provide a satisfactory antimicrobial effect to the hard surfaces treated with the largely aqueous compositions of the invention. This is particularly surprising as such preferred embodiments of the inventive compositions specifically exclude other antimicrobial constituents such as: quaternary ammonium compounds, biguanides, hypohalites and peroxygen compounds. The inventive compositions also exhibit a low potential for irritation as well as low toxicity levels, allowing them to meet EPA category III or IV requirements, DfE requirements, and/or safe for food contact surface requirements.

The inventive compositions necessarily include an organic acid constituent such as citric acid. Methanesulfonic acid may also be included (e.g., as a pH adjustor). Each of these acids are water soluble, and comprises as least one carboxyl group (—COOH or sulfonic acid group in the case of methanesulfonic acid) in its structure. Citric acid actually includes multiple carboxyl groups (3 to be exact). The organic acid may be present in any effective amount, but desirably for ready to use products is not present in amounts of more than about 5%, 3%, 2% or 1% wt. based on the total weight of the compositions (generally from about 0.4% to about 1.5% wt.). For dilutable products, the organic acid may be present at higher fractions (e.g., 2.0% to 90% wt.) of actives in the formula, depending on the dilution factor and the use instructions. Products that are used in the presence of water, such as toilet bowl cleaning products, laundry products, and other similar products, may be considered dilutable products where the organic acid may be present at 2.0% to 90% wt. of actives in the formula. Further, the amount of acid present in the composition, keeping in mind any optional ingredients that may be present, should be in an amount such that the pH of the composition in use is less than 3, or less than 2.5, such as from 1 to 2.5, or 1.2 to 2.4, or 1.5 to 2.4.

The dilutable product may be, without limitation, a thin aqueous liquid, a non aqueous liquid, a gel, a paste, a powder, one or more compositions contained in a water-soluble film, or a tablet. It may be a part of a delivery system that releases the concentrated composition for dilution into a ready to use disinfecting or sanitizing product. The inventive compositions may also be diluted in a bucket as a floor cleaner or into a toilet bowl for disinfection and sanitization.

The composition may be void or substantially void of volatile organic compounds (VOC's), including glycol ethers, or lower alcohol solvents. For example, no such components may be included in the composition, other than, e.g., a negligible fraction that may be present as part of a fragrance package, or the like.

Further features and advantages of the present invention will become apparent to those of ordinary skill in the art in view of the detailed description of preferred embodiments below, when considered together with the attached claims.

DETAILED DESCRIPTION OF THE PREFERRED EMBODIMENTS

I. Definitions

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

As used herein, "disposable" is used in its ordinary sense to mean an article that is disposed or discarded after a limited number of usage events, preferably less than 25, more preferably less than about 10, and most preferably after a single usage event. The wipes disclosed herein are typically disposable.

As used herein, the term "substrate" is intended to include any material that is used to clean an article or a surface. Examples of cleaning substrates include, but are not limited to, wipes, mitts, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. These substrates can be used for hard surface, soft surface, and personal care applications. Such substrates may typically be in the form of a wipe.

Such substrates may be formed of a structure of individual fibers which are interlaid, typically in a manner that is not identifiable (e.g., a nonwoven). The nonwoven substrates, or layers used to make up such a nonwoven substrate included in the present substrates may be formed by any suitable process. For example, they may be meltblown, spunbond, spunlaid, SMS (spunbond-meltblown-spunbond), coformed, carded webs, thermal bonded, thermoformed, spunlace, hydroentangled, hydroembossed, needled, or chemically bonded. Various processes for forming such nonwovens will be apparent to those of skill in the art, many of which are described in U.S. Pat. No. 7,696,109, incorporated herein by reference in its entirety. EP Applications EP992338, EP1687136, EP1861529, EP1303661, and US2004/0157524 are also herein incorporated by reference, each in its entirety. These references describe various nonwoven structures which are generally illustrative, and which may be modified by using biodegradable and/or compostable synthetic binder fibers rather than the synthetics typically employed in the prior art.

The terms "wipe", "substrate" and the like may thus overlap in meaning, and while "wipe" may typically be used herein for convenience, it will be appreciated that this term may often be interchangeable with "substrate".

As used herein, "wiping" refers to any shearing action that the wipe undergoes while in contact with a target surface. This includes hand or body motion, substrate-implement motion over a surface, or any perturbation of the substrate via energy sources such as ultrasound, mechanical vibration, electromagnetism, and so forth.

The cleaning compositions dosed onto the substrate as described herein may provide sanitization, disinfection, or sterilization, other cleaning, or other treatment. As used herein, the term "sanitize" shall mean the reduction of "target" contaminants in the inanimate environment to levels considered safe according to public health ordinance, or that reduces a "target" bacterial population by significant numbers where public health requirements have not been established. By way of example, an at least 99% reduction in bacterial population within a 24 hour time period is deemed "significant." Greater levels of reduction (e.g., 99.9%, 99.99%, etc.) are possible, as are faster treatment times (e.g., within 10 minutes, within 5 minutes, within 4 minutes, within 3 minutes, within 2 minutes, or within 1 minute), when sanitizing or disinfecting.

As used herein, the term "disinfect" shall mean the elimination of many or all "target" pathogenic microorganisms on surfaces with the exception of bacterial endospores.

As used herein, the term "sterilize" shall mean the complete elimination or destruction of all forms of "target" microbial life and which is authorized under the applicable regulatory laws to make legal claims as a "sterilant" or to have sterilizing properties or qualities.

Some embodiments may provide for at least a 2 or more log reduction (e.g., 3-log reduction, or 6-log reduction) in a bacterial population within a designated time period (e.g., 10 minutes, 5 minutes, 4 minutes, 3 minutes, 1 minute, 30 seconds, 10 seconds or the like). A 2-log reduction is equivalent to a 99% reduction, a 3-log reduction is equivalent to at least a 99.9% reduction, a 4-log reduction is equivalent to at least a 99.99% reduction, a 5-log reduction is equivalent to at least a 99.999% reduction, etc. An example of a target microbe may be *Staphylococcus aureus*. It will be appreciated that antimicrobial efficacy can also be achieved against other target microbes, numerous examples of which will be apparent to those of skill in the art.

As used herein, the term "cleaning composition" is meant to mean and include a cleaning formulation having at least one surfactant.

As used herein, the term "surfactant" is meant to mean and include a substance or compound that reduces surface tension when dissolved in water or water solutions, or that reduces interfacial tension between two liquids, or between a liquid and a solid. The term "surfactant" thus includes anionic, nonionic and/or amphoteric agents. In at least some embodiments of the present invention, the composition only includes an anionic surfactant, such that other types of surfactants may be specifically excluded.

The term "Safer Choice" means the U.S. EPA program that is focused on identifying safer sanitizing and disinfecting active ingredients. The pesticide portion of the "Safer Choice" program is called "Design for the Environment" or "DfE". The EPA has a special approval process for products that meet the DfE criteria. The EPA, as part of the DfE program has identified certain active ingredients that are approved for antimicrobial cleaning products and authorized to use the DfE logo. The antimicrobial cleaning products that have been approved under the DfE program may be found under https://www.epa.gov/pesticide-labels/design/environment-logo-antimicrobial-pesticide-products#authorizeddfe. All products approved for DfE program must have only ingredients that meet the "Safer Choice Standard" according to https://www.epa.gov/pesticide-labels/design/environment-logo-antimicrobial-pesticide-products#approved and https://www.epa.gov/saferchoice/safer-choice-standard. The above EPA publications are herein incorporated by reference in their entirety.

The term "food contact surface" means as defined by the EPA and/or FDA. For example, the FDA defines the term in its "Food Code" 1-201.10 as (1) a surface of equipment or a utensil with which food normally comes into contact; or (2) a surface of equipment or a utensil from which food may drain, drip, or splash (a) into a food, or (b) onto a surface normally in contact with food. Compositions meeting safe for food contact surface requirements are defined under 40 CFR 180.940(a), 40 CFR 180.950 and/or 40 CFR 180.960, each of which is herein incorporated by reference in its entirety.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Acid

In one aspect of the invention, the acidic cleaning composition comprises: a carboxylic acid or mixture of carboxylic acids. In one embodiment of the invention, there is only one carboxylic acid in the cleaning composition, not counting small amounts of a fatty acid that may also be included, which technically may be a carboxylic acid, but which is included for a purpose other than principal disinfection or sanitization provided by the contemplated carboxylic acid, such as citric acid. The acid present for sanitization or disinfection may have 6 carbon atoms or less, such as from 3 to 6, or 4 to 6 carbon atoms. In one embodiment of the invention, the acidic cleaning composition is free of lactic acid and/or glycolic acid. A suitable carboxylic acid for sanitization or disinfection includes citric acid. The composition may also include an alkylsulfonic acid such as methanesulfonic acid. Suitable compositions comprise at least one such acid for disinfection or sanitization in concentrations of 0.1% to 5%, 0.2% to 4%, 0.3% to 3%, 0.4% to 2%, 0.4% to 1.5%, 0.4% to 1%, or 0.4% to 0.8% by weight. Concentrated formulations will yield these levels at use dilution.

The present compositions may provide sanitization principally through use of citric acid. In such embodiment, other carboxylic acids (e.g., lactic acid, glycolic acid, tartaric acid, etc.) may be absent, or at least limited in concentration. For example, in an embodiment, other carboxylic acids may be present individually or collectively in an amount of no more than 0.25%, no more than 0.1%, or no more than 0.05%. Similarly, the composition may be void, or substantially void of other carboxylic acids having 5 or less, 4 or less, 3 or less, or 2 or less carbon atoms.

As noted, in addition to the acid component(s) included for sanitization or disinfection (e.g., citric acid), the composition may also include a small fraction of a fatty acid. Fatty acids may include $C_6$-$C_{22}$ fatty acids, linear or branched, aromatic or aliphatic such as fatty acids having from 8 to 18, 8 to 16, or 8 to 14, or 8 to 12 carbon atoms. In an embodiment, the included fatty acids are linear aliphatic fatty acids. Examples of such fatty acids that may be present include, but are not limited to octanoic acid (i.e., caprylic acid), decanoic acid, or lauric acid. Such a fatty acid may be present in a very small amount, such as from 0.0001% to 0.1%, from 0.001% to 0.05%, or from about 0.005% to about 0.02% by weight (e.g., about 0.01% by weight). As shown below in the Examples, Applicant has found that the inclusion of such small levels of a fatty acid can enhance the antimicrobial efficacy of the present compositions.

III. Anionic Surfactants

In one aspect of the invention, the acidic cleaning composition contains an anionic surfactant. Inventive formulations that are designed for use as sprays or lotion loaded wipes on kitchen counters, other kitchen surfaces such as sinks, stovetops, refrigerator and microwave interiors and other food contact surfaces are typically free of surfactants containing ethylene oxide groups, in order to minimize amounts of 1,4 dioxane on these surfaces.

The anionic surfactant can be a sulfate, a sulfonate, or any salts or derivatives thereof. Suitable anionic surfactants include, but are not limited to: organosulfates including methylsulfates and sulfate esters. Suitable sulfonates include both sulfonate salts and sulfonic esters. Specific examples of anionic surfactants include, but are not limited to: sodium lauryl sulfate (SLS), secondary alkane sulfonate (SAS), sodium xylene sulfonate (SXS), sodium lauryl ether sulfate (SLES), ammonium lauryl sulfate (ALS), alkylbenzene sulfonates (LAS), sodium cumene sulfonate (SCS), sodium toluene sulfonate (STS), branched alkylbenzene sulfonates (BAS), and any mixtures or combinations thereof. In one embodiment, the anionic surfactant is selected from: alkyl sulfates, alkyl sulfonates including secondary alkyl sulfonates, and alkylbenzene sulfonates and any mixtures or combinations thereof. In yet another embodiment, the anionic surfactant is sodium lauryl sulfate (SLS) or a secondary alkane sulfonate (SAS). The anionic surfactant may be included in either a free acid or salt form. In an embodiment, the alkyl group of an alkyl sulfate or secondary alkane sulfonate may have from 6 to 18, from 6 to 16, or from 8 to 12 carbon atoms. Suitable compositions include only extremely low concentrations of the anionic surfactant, e.g., such as from 0.01% to 1% by weight, 0.01% to 0.8% by weight, 0.01% to 0.5% by weight, 0.01% to 0.1% by weight, 0.01% to 0.05% by weight or 0.01% to 0.035% by weight. In an embodiment, the amount of anionic surfactant may be less than 0.1% by weight (1000 ppm), less than 0.05% (500 ppm), or no more than 350 ppm. In an embodiment, the anionic surfactant may be the only included surfactant. In other words, the composition may be void of nonionic surfactants, cationic surfactants, amphoteric surfactants, zwitterionic surfactants, etc.

IV. Solvents

In one embodiment of the invention, the acidic cleaning composition comprises one or more non-volatile glycol solvents such as an alkylene glycol. By one acceptable definition in the field and regulations, "non-volatile", may mean that the solvent (other than water) has a vapor pressure at ambient temperature and pressure (e.g., 1 atm. and 20° C.) of no more than 0.1 mm Hg. The solvent may be a diol, such as a methylene, ethylene, propylene, butylene, and/or a hexylene glycol. Dipropylene glycol and propylene glycol are particular examples of suitable non-volatile glycol solvents. The composition may advantageously be free or substantially free of solvents often included in such cleaning compositions which are classified as volatile organic compounds, for example, having a vapor pressure at ambient temperature and pressure (e.g., 1 atm. and 20° C.) of more than 0.1 mm Hg. Examples of such excluded solvents include, but are not limited various glycol ethers, as well as alcohols such as methanol, ethanol, n-propanol, isopropanol, butanol, pentanol, hexanol, decanol and isomers thereof. In an embodiment, where such components are included, they may be present at only very low levels, such as less than 0.5%, less than 0.45%, less than 0.3%, less than 0.1%, or the like. In one embodiment, other than the water, the only solvents in the acidic cleaning composition consist of one or more non-volatile glycol solvents. In a further embodiment, the composition may be free of any organic solvents and include at least 95% water.

In an embodiment, the solvent may be present in the composition in an amount of from 0.1% to 5% by weight, 0.2% to 5% by weight, 0.5% to 4% by weight, 0.5% to 3% by weight, 0.5% to 2% by weight, or 0.5% to 1.5% by weight.

V. Water

When the composition is an aqueous composition, water can be a predominant ingredient. The water may be present in the composition at a level of at least 90%, at least 95%, or at least 97% by weight. Concentrated formulations may include significantly less if any water, but upon dilution for use, the water may be present in such values as noted above. Deionized or filtered water is preferred. Where the cleaning composition is concentrated, the water may be present in the composition at a concentration of less than about 85% by weight.

VI. Additional Adjuvants

The acidic cleaning composition may optionally include and/or be used in combination with one or more additional adjuncts. The adjuncts include, but are not limited to, fragrances or perfumes, waxes, dyes and/or colorants, solubilizing materials, stabilizers, thickeners, defoamers, hydrotropes, buffers, pH adjusters, builders, lotions and/or mineral oils, cloud point modifiers, and/or preservatives. A variety of builder detergents may be suitable for use in combination with the cleaning composition. Such builder detergents may include, but are not limited to, phosphate-silicate compounds, zeolites, alkali metal, ammonium and substituted ammonium polyacetates, methylglycine diacetic acid and its salts, N,N-dicarboxymethyl glutamic acid and its salts, mono-, di-, and tri-alkali salts of nitrilotriacetic acid, carboxylates, aluminosilicate materials, silicates, polycarboxylates, polyitaconic acid, zeolites, carbonates, phosphates, bicarbonates, polyphosphates, amines, alkanolamines, aminopolycarboxylates, polyhydroxysulfonates, starch derivatives, ethylenediamine tetraacetate, and/or metal ion sequestrants (e.g., aminopolyphosphonates such as, but not limited to, ethylenediamine tetramethylene phosphonic acid and diethylene triamine pentamethylenephosphonic acid).

In one embodiment, the builder is free of phosphorus compounds. In one embodiment, the builder is free of nitrilotriacetic acid and/or its salts. In one embodiment, the builder detergent includes polyacetate and/or polycarboxylate compounds. In one aspect of this embodiment, the polyacetate and/or polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, polyitaconic acid, acetic acid, and citric acid. In one embodiment, the buffering and pH adjusting agents, when used, include, but are not limited to, organic acids, mineral acids, alkali metal and alkaline earth salts of silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and/or 2-amino-2methylpropanol.

The buffering agent can be an active detergent in its own right, and/or can be a low molecular weight, organic or inorganic material used for maintaining the desired pH. The buffer can be alkaline, acidic or neutral. Non-limiting examples of buffering agents include nitrogen-containing materials (e.g., lysine; lower alcohol amines like mono-, di-, and tri-ethanolamine; tri(hydroxymethyl) amino methane; 2-amino-2-ethyl-1,3-propanediol; 2-amino-2-methyl-propanol; 2-amino-2-methyl-1,3-propanol; disodium glutamate; methyl diethanolamide; 2-dimethylamino-2-methylpropanol; 1,3-bis(methylamine)-cyclohexane; 1,3-diamino-propanol; N,N'-tetra-methyl-1,3-diamino-2-propanol; N,N-bis(2-hydroxyethyl)glycine; tris(hydroxymethyl)methyl glycine; ammonium carbamate; citric acid; acetic acid; ammonia; alkali metal carbonates; and/or alkali metal phosphates). For additional buffers that can be used, see McCutcheon's EMULSIFIERS AND DETERGENTS, North American Edition, 1997, McCutcheon Division, MC Publishing Company which is incorporated herein by reference.

In yet another and/or alternative embodiment, the solubilizing materials, when used, include, but are not limited to; hydrotropes (e.g., $C_6$-$C_8$ alkylpolyglucosides and water soluble salts of low molecular weight organic acids such as the sodium and/or potassium salts of xylene sulfonic acid, cumene sulfonic acid, and toluene sulfonic acid). In another and/or alternative embodiment, the acids, when used, include, but are not limited to, organic hydroxy acids, citric acid, keto acid, and the like. In still another and/or alternative embodiment, thickeners, when used, include, but are not limited to, polyacrylic acid, xanthan gum, calcium carbonate, aluminum oxide, alginates, guar gum, clays, and/or methyl, ethyl, or propylhydroxycelluloses. In yet another and/or alternative embodiment, defoamers, when used, include, but are not limited to, $C_8$-$C_{20}$ fatty acids, silicones, aminosilicones, silicone blends, and/or silicone/hydrocarbon blends. In still a further and/or alternative embodiment, preservatives, when used, include, but are not limited to, mildewstats or bacteriostats, methyl, ethyl and propyl parabens, bisguanidine compounds (e.g., Dantagard and/or Glydant) and/or short chain alcohols (e.g., ethanol and/or IPA). In one aspect of this embodiment, the mildewstats or bacteriostats include, but are not limited to, mildewstats (including non-isothiazolone compounds) include Kathon GC, a 5-chloro-2-methyl-4-isothiazolin-3-one, Kathon ICP, a 2-methyl-4-isothiazolin-3-one, and a blend thereof, and Kathon 886, a 5-chloro-2-methyl-4-isothiazolin-3-one, all available from Rohm and Haas Company; Bronopol, a 2-bromo-2-nitropropane-1,3-diol, from Boots Company Ltd.; Proxel CRL, a propyl-p-hydroxybenzoate, from ICI PLC; Nipasol M, an o-phenyl-phenol, Na+ salt, from Nipa Laboratories Ltd.; Dowicide A, a 1,2-Benzoisothiazolin-3-one, from Dow Chemical Co.; and Irgasan DP 200, a 2,4,4'-trichloro-2-hydroxydiphenylether, from Ciba-Geigy A.G. Natural preservatives include benzyl alcohol, potassium sorbate and bisabalol; sodium benzoate and 2-phenoxyethanol. In one embodiment of the invention, the inventive composition is free from paraben compounds. In another embodiment of the invention, the inventive composition is free of isothiazolinone compounds. In a further embodiment of the invention, the inventive composition is free of preservatives.

In addition, the inventive compositions may contain one or more vitamins or vitamin precursors known to enhance antimicrobial performance. Examples of these include retinal, retinol, tocopherols, ascorbic acid, and vitamins D, E and K.

The acidic cleaning compositions optionally may contain dyes, colorants and preservatives, or contain one or more, or none of these components. These dyes, colorants and preservatives can be natural (occurring in nature or slightly processed from natural materials) or synthetic.

Dyes and colorants include synthetic dyes such as Liquitint® Yellow or Blue or natural plant dyes or pigments, such as a natural yellow, orange, red, and/or brown pigment, such as carotenoids, including, for example, beta-carotene and lycopene. One embodiment of the invention is free from paraben compounds. Another embodiment of the invention is free of isothiazolinone compounds. A further embodiment of the invention is free of preservatives.

VII. Excluded Components

In one embodiment, the formulations of the present invention are free from oxidants such as peroxide, peracetic acid, hypochlorite, hypochlorous acid, hypohalites, and other similar oxidants. The inventive compositions may also be free of quaternary ammonium compounds, biguanides, triclosan, triclocarban, iodine, and surfactants containing a fluorine atom, surfactants containing alkoxy groups (e.g., ethoxy or propoxy groups), alkylpolyglucosides, alcohol alkoxylates (e.g., ethoxylates), other nonionic surfactants, amine oxides other amphoteric surfactants, and the like. The inventive compositions may be free or substantially free of antimicrobial actives selected from: benzyl alcohol, phenols, chlorinated phenols, biguanides, bis-amines, thymol, metal nanoparticles, and any mixtures or combinations thereof. The inventive composition may be free from strong inorganic acids, including but not limited to, hydrochloric, nitric, sulfuric, and phosphoric acids. In one embodiment, the inventive composition may contain only one organic acid (e.g., citric acid) in an amount greater than 0.1%, or greater than 0.25%. While the composition may also contain methanesulfonic acid and/or a fatty acid, such components are typically present in an amount of no more than 0.1%, each. In one embodiment, the inventive composition only comprises two acids: citric acid and a fatty acid. In another embodiment, the inventive composition only comprises two acids: citric acid and methanesulfonic acid. In a further embodiment, the inventive composition comprises three acids: citric acid, methanesulfonic acid and a fatty acid. As illustrated in the examples, the fatty acid itself in any such embodiments may actually include a plurality of different fatty acids. By way of example, the methane sulfonic acid may be present in an amount of about 0.05% to 0.25% (e.g., about 0.1%), while the fatty acid(s) may be present (individually or collectively) in an amount from 0.005% to 0.05% or 0.05% to 0.03% by weight.

In another embodiment of the invention, certain alcohol and glycol ether solvents may be excluded from the acid cleaning composition. In this embodiment, the inventive compositions are free of or substantially free of water-miscible short chain (e.g., $C_1$-$C_4$) alcohols, such as methanol, ethanol, iso-propanol and the like. A small amount, about 0.1% by weight or less or 0.01% by weight or less, of these alcohols may be present if they are part of the optional fragrance, but are not intentionally added, in and of themselves. In another embodiment, the inventive compositions are free from glycol ethers and/or glycol ether esters. In some acidic cleaning compositions the glycol ether esters may be detrimental to long term chemical stability of the composition. The inventive compositions may also be free of glycol ether solvents, such as DOWANOL, HEXYLCELLOSOLVE, and the like.

In another embodiment of the invention, the inventive acid cleaning composition is free from synthetic zwitterionic surfactants, such as cocoamidopropyl betaine, and/or sultaines. The inventive acidic cleaning composition may also be free from: aromatic disulfonates (e.g. alkyl phenoxy disulfonates such as DOWFAX materials) and alkyl naphthalene sulfonates and alkyl phenol ethoxylates amine oxides and inorganic phosphate salts. Other components that may be excluded from at least some embodiments of the present compositions include N-acyl sarcosinates, other N-acylated species (e.g., N-acylated peptides or amino acids), aromatic hydrotropes (e.g., cumene sulfonate, and/or xylene sulfonate), alkylpolyglucosides, other nonionic surfactants, alkylbenzene sulfonates, or any other compounds not specifically mentioned as included herein.

VIII. pH

The pH of the cleaning composition is measured directly as ready to use, without further dilution. The cleaning compositions can have a pH that is relatively low, such as less than 2.5, or less than 2.4, such as from 1 to 2.5, or 1 to 2.4, from 1.2 to 2.4, from 1.5 to 2.4, or from 1.6 to 2.3. Exemplary pH values may include 1.5, 1.6, 1.7, 1.8, 1.9, 2.0, 2.1, 2.2, 2.3, or 2.4. Ranges between any such values may be appropriate for use.

IX. Antimicrobial Compounds, Disinfectants and Sanitizers

The acidic cleaning compositions contain an acid, but are free of, or contain substantially no, additional disinfectants or sanitizers, such as quaternary ammonium antimicrobials, biguanides, peroxides or hypohalite compounds. Although the compositions may contain minor amounts (e.g. less than 0.5% or less than 0.2% or less than 0.1%) of traditional antimicrobials as preservatives or buffers, the compositions are without the use of traditional quaternary ammonium compounds. Non-limiting examples of these quaternary compounds include benzalkonium chlorides and/or substituted benzalkonium chlorides, di($C_6$-$C_{14}$)alkyl di short chain ($C_{1-4}$ alkyl and/or hydroxyalkyl) quaternary ammonium salts, N-(3-chloroallyl) hexaminium chlorides, benzethonium chloride, methylbenzethonium chloride, and cetylpyridinium chloride. Other quaternary compounds include the dialkyldimethyl ammonium chlorides, alkyl dimethylbenzylammonium chlorides, dialkylmethyl-benzylammonium chlorides, and mixtures thereof. Biguanide antimicrobial actives including, but not limited to polyhexamethylene biguanide hydrochloride, p-chloro-phenyl biguanide; 4-chlorobenzhydryl biguanide, halogenated hexidine such as, but not limited to, chlorhexidine (1,1'-hexamethylene-bis-5-(4-chlorophenyl) biguanide) and its salts are also in this class.

The present formulations may or may not include an associative polyelectrolyte complex (PEC), as described in U.S. Provisional Patent Application Ser. No. 63/068,706, filed on Aug. 21, 2020, herein incorporated by reference in its entirety. Specific, non-limiting examples of such PECs are disclosed in U.S. Pat. Nos., to Scheuing et al., U.S. Pat. Nos. 9,474,269, 9,796,872, 9,273,220, 9,012,389, 8,993,505, 9,796,872, 9,593,299, 9,809,790, 9,663,747, 9,486,800, 9,309,435, 9,976,109, 10,400,131, 10,208,275, 10,563,156 and 10,066,196, each of which is incorporated herein by reference in its entirety. In a particular embodiment of the present formulations, no such associated PECs are included.

X. Cleaning Substrate

The cleaning composition, when used to clean hard surfaces, may be used in conjunction with one or more absorbent and/or adsorbent materials. The cleaning composition can be sprayed and/or poured or squirted onto a hard surface to be cleaned and an absorbent and/or adsorbent material such as, but not limited to, a sponge, mop head, cloth, towel, and the like is then used to spread the cleaning composition on the hard surface and/or clean the hard surface. Additionally or alternatively, the cleaning composition is at least partially loaded on the absorbent and/or adsorbent material prior to the absorbent and/or adsorbent material at least partially applying the cleaning composition onto the hard surface and/or cleaning the hard surface.

The present invention also contemplates the pre-loading of the cleaning composition on a cleaning pad and/or cleaning wipe. In one embodiment, the cleaning wipe includes, but is not limited to, a woven and/or a nonwoven material. In one aspect of this embodiment, the nonwoven material includes, but is not limited to, nonwoven, fibrous sheet materials. In another and/or alternative aspect of this embodiment, the nonwoven material includes, but is not limited to, meltblown, coform, air-laid, spun bond, wet laid, bonded-carded web materials, and/or hydroentangled (also known as spunlaced) materials. In still another and/or alternative aspect of this embodiment, the woven material includes, but is not limited to, cotton fibers, cotton/nylon blends and/or other textiles. The fibers may be staple fibers, filaments, microfilaments, and any combination thereof. In another and/or alternative embodiment, the cleaning wipe includes a sponge and/or sponge-like material. In one aspect of this embodiment, the sponge and/or sponge-like material includes, but is not limited to, regenerated cellulose and/or polyurethane foams. In still another and/or alternative embodiment, the cleaning wipe includes, but is not limited to, wood pulp, a blend of wood pulp, and/or synthetic fibers. In one aspect of this embodiment, the synthetic fibers include, but are not limited to, polyester, rayon, nylon, polypropylene, polyethylene, and/or cellulose polymers. In still another and/or alternative embodiment, the cleaning wipe includes a binder. The cleaning pad or cleaning wipe may be a multi-layered structure with different materials. For example the cleaning pad may include layers of nonwoven material, woven materials, microfiber materials, sponge layers, foam layers, abrasive materials, etc.

The cleaning composition on the cleaning pad or cleaning wipe is typically in a ready to use liquid form; however, the cleaning composition can be in a concentrate in liquid, semi-liquid or solid form on the cleaning pad or cleaning wipe. Typically, the cleaning wipe has at least one layer of nonwoven material. The cleaning pad can also include one or more layers of nonwoven material.

Manufacturers of cleaning wipes that can be used in the present invention include, but are not limited to, Suominen, PGI, Kimberly-Clark, E.I. Du Pont de Nemours and Company, Dexter, American Nonwovens, and James River, BBA Nonwoven. Specific, non-limiting examples of cleaning wipes from these manufacturers are disclosed in Bouchette et al., U.S. Pat. Nos. 4,781,974 and 4,615,937; Clark et al, U.S. Pat. No. 4,666,621; Amundson et al., WO 98/03713; Cabell et al., U.S. Pat. No. 5,908,707; Mackey et al., WO 97/40814; Mackey et al., WO 96/14835; and Moore, EP 750063, all of which are incorporated herein by reference.

The cleaning pad typically has an absorbent capacity, when measured under a confining pressure of 0.09 psi after 20 minutes, of at least about 1 g deionized water per g of the cleaning pad. The cleaning pad will also typically have a total fluid capacity (of deionized water) of at least about 100 g. However, the absorbency and/or fluid capacity of the cleaning pad can vary depending on the desired use of the cleaning pad. The cleaning wipe can have the same or different amount of absorbency.

The loading ratio of the cleaning composition onto the cleaning wipe or cleaning pad can be about 2:1 to 5:1, and typically about 3:1 to 4:1; however, other loading ratios can be used. In a further and/or alternative embodiment, the liquid loading capacity of the cleaning wipe or pad is sufficient to retain the desired amount of cleaning composition on the cleaning wipe or pad. In one aspect of this embodiment, the liquid loading capacity of the cleaning wipe or pad is at least about 10% of the dry weight of the cleaning wipe or pad. In another and/or alternative aspect of this embodiment, the liquid loading capacity of the cleaning wipe or pad is about 50%-1000% of the dry weight of the cleaning wipe or pad. This loading capacity is expressed as loading ½ to 10 times the weight (or, more accurately, the mass) of the dry cleaning wipe or pad. In still another and/or alternative aspect of this embodiment, the liquid loading capacity of the cleaning wipe or pad is about 200%-800% of the dry weight of the cleaning wipe or pad.

In yet another and/or alternative aspect of this embodiment, the liquid loading capacity of the cleaning wipe or pad is about 250%-500% of the dry weight of the cleaning wipe or pad. In still yet another and/or alternative aspect of this embodiment, the liquid loading capacity of the cleaning wipe or pad is about 300%-450% of the dry weight of the cleaning wipe or pad. In still a further and/or alternative embodiment, the cleaning composition is impregnated, dosed, loaded, metered, and/or otherwise dispensed onto the cleaning wipe or pad. The loading of the cleaning wipe or pad can be accomplished in several ways including, but not limited to, treating each individual wipe or pad with a discrete amount of cleaning composition, mass treating a continuous web of cleaning wipes with the cleaning composition, soaking the entire web of cleaning wipes in the cleaning composition, spraying the cleaning composition in a stationary or moving web of cleaning wipes, and/or impregnating a stack of individually cut and sized cleaning wipes or pad in a container and/or a dispenser.

In another and/or alternative embodiment, the cleaning wipe or pad has a wet tensile strength of at least about 25-250 Newton/m. In one aspect of this embodiment, the cleaning wipe or pad has a wet tensile strength of about 25-250 Newton/m. In another and/or alternative aspect of this embodiment, the cleaning wipe or pad has a wet tensile strength of about 75-170 Newton/m. Such values may be for the machine direction, the cross-direction, or both. The cleaning composition can be loaded onto the cleaning wipe and/or cleaning pad in any number of manufacturing methods. Typically, the cleaning wipe or cleaning pad is sprayed with or soaked in the cleaning composition for a period of time until the desired amount of loading is achieved.

The cleaning pad or cleaning wipe can also be part of a cleaning kit or tool. The cleaning pad or cleaning wipe can also have an attachment layer that allows the cleaning pad or cleaning wipe to be connected to and/or disconnected from an implement's handle or the support head or an implement (e.g., mop, broom, etc.). The attachment layer can also function to prevent fluid flow through the top surface (e.g., the handle-contacting surface) of the cleaning pad or cleaning wipe, and/or can further provide enhanced integrity for the cleaning pad or cleaning wipe. The kit can have an assembly of one or more units, either packaged together or separately. The kit can comprise an implement containing a cleaning pad or cleaning wipe that may or may not include a superabsorbent material, and the cleaning composition. The cleaning pad or cleaning wipe can be detachably mounted on the implement so that the cleaning pad or cleaning wipe can be removed and/or replaced with a fresh clean pad or cleaning wipe. The implement can also have a reservoir that contains the cleaning composition. The reservoir can be refillable or contain a non-refillable amount of cleaning composition. The reservoir can also be detachably mounted on the implement to allow for easy refilling or replacing with a filled reservoir.

In still a further and/or alternative embodiment of the present invention, the cleaning wipes and/or pads can have an attachment layer that allows the wipe and/or pad to be connected to an implement's handle or the support head of various implements. The attachment layer is used in those embodiments where the absorbent and/or adsorbent layer is not suitable for attaching the wipe and/or pad to the support head of the handle. The attachment layer can also function as a mechanism to inhibit or prevent fluid flow through the top surface (e.g., the handle-contacting surface) of the cleaning wipe and/or pad, and/or can provide enhanced integrity of the wipe and/or pad. In one aspect of this embodiment, the attachment layer can consist of a monolayer or a multi-layer structure. In another and/or alternative aspect of this embodiment, the attachment layer can comprise a surface which is capable of being mechanically attached to the handle's support head by use of a hook and loop system. In one specific design, the attachment layer can comprise at least one surface which is mechanically attachable to hooks that are affixed to the bottom surface of the handle's support head.

In another and/or alternative aspect of the present invention, the cleaning wipe or pad can be individually sealed with a heat-sealable and/or glueable thermoplastic overwrap such as, but not limited to, polyethylene, Mylar or the like. In one embodiment, the cleaning wipes or pads are packaged as numerous, individual sheets or pads which are at least partially, impregnated with the cleaning composition of the present invention. In another and/or alternative embodiment, the cleaning wipes are at least partially formed as a continuous web during the manufacturing process and loaded into a dispenser such as, but not limited to, a canister with a closure or a tub with closure. The closure is at least partially used to seal the loaded cleaning wipes from the external environment and/or prevent premature volatilization of the components of the cleaning composition.

In one aspect of this embodiment, the dispenser includes a plastic such as, but not limited to, high density polyethylene, polypropylene, polycarbonate, polyethylene terephthalate (PET), polyvinyl chloride (PVC), and/or other rigid plastic. In another aspect and/or alternative of this embodiment, the continuous web of cleaning wipes is at least partially threaded through an opening in the top of the dispenser. In still another and/or alternative aspect of this embodiment, the dispenser includes a severing arrangement to cut at least a portion of the cleaning wipe after being at least partially removed from the dispenser. The severing arrangement can include, but is not limited to, a knife blade, serrated edge, and/or the like. In still yet another and/or alternative aspect of this embodiment, the continuous web of cleaning wipes can be scored, folded, segmented, and/or partially cut into uniform and/or non-uniform sizes, and/or lengths. In a further and/or alternative aspect of this embodiment, the cleaning wipes can be interleafed so that the removal of one cleaning wipes advances the next in the opening of the dispenser.

In an embodiment, the cleaning composition is generally not impregnated in a cleaning substrate. Because of the limited number of ingredients, these compositions may tend to perform better when used with a substrate at the time of application or use, and not sold as a pre-wetted substrate. Examples of suitable substrates include, nonwoven substrates, woven substrates, hydroentangled substrates, foams and sponges and similar materials which can be used alone or attached to a cleaning implement, such as a floor mop, handle, or a hand held cleaning tool, such as a toilet cleaning device. The terms "nonwoven" or "nonwoven web" means a web having a structure of individual fibers or threads which are interlaid, but not in an identifiable manner as in a knitted web.

EXAMPLES

The acidic cleaning compositions are high performance cleaning formulations with a low toxicity profile, good cleaning performance and sanitization or disinfection efficacy. In particular, the compositions are capable of providing sanitization or disinfection (e.g., a 2 log reduction, 3 log reduction or better) against a target microbe within 4 minutes or less, without inclusion of any typical antimicrobial agents (such as quaternary ammonium compounds, biguanides, triclosan, hypohalites, peroxides, or the like, simply with the use of a relatively low concentration of citric acid, in combination with an extremely low level of an anionic surfactant. The compositions may meet standards of EPA category III or IV, DfE, and/or being safe for use on food contact surfaces without rinsing. Such a combination of features is particularly advantageous, and the ability to achieve such is surprising. Table 1 below illustrates some exemplary acidic cleaning compositions exhibiting such features. Unlike some of the prior art acidic cleaning compositions, the inventive compositions in Table 1 have less than 5%, less than 4%, less than 3%, less than 2% citric acid by weight, or no more than 1% citric acid by weight and there are no other antimicrobial constituents in the inventive compositions. By way of example, the formulas of Table 1 were tested against *Staphylococcus aureus* at various contact times, on 60 carriers, with the results shown in Table 1. The testing for antimicrobial efficacy on *Staphylococcus aureus* can be performed according to any suitable applicable standard. One such standard is the "Standard Operating Procedure for Disinfectant Towelette Test: Testing of *Staphylococcus aureus, Pseudomonas aeruginosa* and *Salmonella enterica*" provided by the EPA under SOP Number MB-09-07, revised on Mar. 4 2019. The EPA SOP MB-09-07 testing procedures are hereby incorporated by reference in their entirety. Such compositions may also be tested for safety according to the "EPA (2015) Use Of An Alternate Testing Framework For Classification Of Eye Irritation Potential Of EPA Pesticide Products". Tests were conducted using the EpiOcular method under such standard. In the EpiOcular (EO) assay, irritancy potential is measured by the exposure time required for the test substance to reduce tissue viability to 50% of controls (ET50). If the ET50 score is ≥4 minutes, but <70 minutes, the material is classified as EPA category III. If the ET50 score is ≥70 minutes, the material is classified as EPA category IV. The above testing guidelines are hereby incorporated by reference in their entirety.

TABLE 1

| Ingredient | Formula AA (pH = 2.09) | Formula AH (pH = 1.87) | Formula AI (pH = 1.96) | Formula AJ (pH = 1.99) | Formula AK (pH = 2.28) | Formula AL (pH = 1.96) | Formula AN (pH = 2.35) |
|---|---|---|---|---|---|---|---|
| Water | To 100% | To 100% | To 100% | To 100% | To 100% | To 100% | To 100% |
| Citric Acid | 0.6% | 1% | 0.6% | 0.6% | 0.6% | 0.6% | 0.6% |
| Sodium Octane Sulfonate | 0% | 0% | 0.06% | 0% | 0% | 0% | 0% |
| SAS | 0.46% | 0.46% | 0.4% | 0.46% | 0.46% | 0.46% | 0.46% |
| Benzoic Acid | 0% | 0% | 0% | 0% | 0% | 0.1% | 0% |
| MSA | 0.1% | 0.1% | 0.1% | 0.1% | 0% | 0.1% | 0.1% |
| Lauric Acid | 0% | 0% | 0% | 0.01% | 0% | 0% | 0.01% |
| Decanoic Acid | 0% | 0% | 0% | 0% | 0% | 0% | 0.01% |
| Dipropylene glycol | 1% | 1% | 1% | 1% | 1% | 1% | 1% |
| Octanoic Acid | 0.01% | 0.01% | 0.01% | 0.01% | 0.01% | 0.01% | 0.01% |
| Antimicrobial Efficacy (Staph) | 4:30 min 1/60 3:30 min 2/60 | 3:30 min 2/60 | 3:30 min 2/60 | 3:30 min 1/60 | 3:30 min 1/60 | 3:30 min 2/60 | 3:30 min 1/60 |
| Safety | Cat. III | | | | Cat. III | | |

As illustrated by formula AH compared to formula AA, antimicrobial efficacy is not necessarily improved by increasing the citric acid concentration. As illustrated by a comparison of formula AJ to formula AA, antimicrobial efficacy is improved by addition of a very small fraction (e.g., 0.01%) of a fatty acid, such as lauric acid. A comparison of formula AK to AA illustrates that removal of the methanesulfonic acid (MSA) actually similarly increased the antimicrobial efficacy. A comparison of formula AL with formula AA illustrates that addition of another organic acid (e.g., an aromatic acid, such as benzoic acid) does not necessarily improve antimicrobial efficacy. In contrast, the addition of a fatty acid (e.g., decanoic acid and/or lauric acid) added in formula AN does result in improved antimicrobial efficacy, similar to the effect illustrated by formula AJ. Achievement of a score of 1/60 at a given contact time results in a “pass” in such an EPA test, while a score of 2/60 or higher results in a “fail” at the given contact time. It is thus apparent that whether a formula will result in a pass or fail at a given contact time is dependent on many factors, and is somewhat unpredictable. The formulations of Table 1 are designed to meet DfE requirements, while meeting category III or even category IV standards (as detailed in 40 CFR 156.62), while achieving sanitization or disinfection against a target microbe (e.g., *Staphylococcus aureus*) within 5 minutes, or within 4 minutes.

Table 2 below illustrates additional formulations, designed to provide food contact surface safety (i.e., meeting the standards of 40 CFR 180.940(a)), while achieving sanitization and/or disinfection within 4 minutes or less, while meeting category IV EPA safety standards.

TABLE 2

| Ingredient | Formula Z (pH = 1.99) | Formula ZA (pH = 1.99) | Formula ZB (pH = 1.99) | Formula AC (pH = 1.94) |
|---|---|---|---|---|
| Water | To 100% | To 100% | To 100% | To 100% |
| Citric Acid | 0.6% | 1% | 1% | 0.6% |
| SLS | 0.1% | 0.035% | 0.035% | 0% |
| SAS | 0% | 0% | 0% | 0% |
| APG | 0% | 0% | 0.425% | 0% |
| MSA | 0.1% | 0.1% | 0.1% | 0.1% |
| propylene glycol | 1% | 1% | 1% | 1% |
| Octanoic Acid | 0.0052% | 0.0052% | 0.0052% | 0.0052% |
| Anti-microbial Efficacy (Staph) | 1:30 min 1/60<br>3:30 min 0/60 | 3:30 min 1/60 | 3:30 min 28/60 | 4:30 min 60/60 |
| Safety | | Cat. IV | | |

Accelerated stability testing was also conducted with formula Z and formula ZA, by storing the formula at 49° C. for a given period of time, and then retesting the aged formula against *Staphylococcus aureus*. After 40 days at 49° C., formula Z scored 23/60 with a contact time of 1:30. After 28 days at 49° C. (equivalent to about 1 year storage at ambient temperature storage), Formula ZA continued to score 1/60 with a contact time of 3:30, still earning a “passing” score. As indicated above, formula ZA meets the EPA’s category IV requirements. The formulations of Table 2 include SLS, rather than SAS, as SAS is not permitted in compositions that are safe for food contact surfaces under 40 CFR 180.940(a). The upper limit for inclusion of SLS under 40 CFR 180.940(a) is 350 ppm, which is the concentration included in formula ZA. A comparison of formula ZB with ZA illustrates the incompatibility of nonionic surfactants (e.g., alkylpolyglucosides) with the present compositions. A comparison with formula AC (which included no SLS or other surfactant) shows the importance of inclusion of a very low concentration of the anionic surfactant, as formula AC shows no significant sanitization or disinfection, scoring 60/60 with a 4:30 contact time.

Table 3 below illustrates additional formulations, also designed to provide food contact surface safety (i.e., meeting the standards of 40 CFR 180.940(a)), while achieving sanitization and/or disinfection within 4 minutes or less, while meeting the EPA’s DfE standards.

TABLE 3

| Ingredient | Formula ZA (pH = 1.99) | Formula ZB (pH = 1.99) | Formula ZC (pH = 1.99) | Formula ZD (pH = 1.99) | Formula ZE (pH = 1.99) |
|---|---|---|---|---|---|
| Water | To 100% | To 100% | To 100% | To 100% | To 100% |
| Citric Acid | 1% | 1% | 1% | 1% | 1% |
| SLS | 0.035% | 0.035% | 0.035% | 0.035% | 0% |
| Sodium octane sulfonate | 0% | 0% | 0.0046% | 0.0046% | 0.0046% |
| Alcohol Ethoxylate | 0% | 0% | 0% | 0% | 0.1% |
| APG | 0% | 0.425% | 0% | 0% | 0% |
| MSA | 0.1% | 0.1% | 0.1% | 0.1% | 0.1% |
| propylene glycol | 1% | 1% | 1% | 1% | 1% |
| Octanoic Acid | 0.0052% | 0.0052% | 0.0052% | 0.0052% | 0.0052% |
| Decanoic Acid | 0% | 0% | 0.1% | 0.1% | 0.1% |
| Lauric Acid | 0% | 0% | 0.1% | 0.1% | 0.1% |
| SXS | 0% | 0% | 0% | 0.05% | 0% |
| Antimicrobial Efficacy (Staph) | 3:30 min 1/60 | 3:30 min 28/60 | 3:30 min 0/60 | 3:30 min 0/60 | 3:30 min 15/60 |

The results for formula ZB were discussed above, whereby nonionic surfactants such as alkylpolyglucosides are incompatible with the present formulations. Formula ZE similarly found alcohol ethoxylate surfactants to also be incompatible with the present formulations. The alcohol ethoxylate present in formula ZE was a $C_{6-12}$ alcohol ethoxylate, with 3.5 moles of ethoxylation. Other alcohol ethoxylates (e.g., with different chain lengths and/or different degrees of ethoxylation) were also tested, showing similar results. Formulas ZC, and ZD illustrate the benefits provided by inclusion of a small amount (e.g., 100 ppm) of a fatty acid, such as decanoic acid and/or lauric acid in addition to the already included octanoic acid. These formulas also illustrate the compatibility of an alkyl sulfonate, such as sodium octane sulfonate. Formula ZD also shows the compatibility of sodium xylene sulfonate (SXS) with the present formulations. Applicable limits for sodium octane sulfonate and SXS, e.g., under 40 CFR 180.940(a), are 46 ppm and 500 ppm, respectively.

Formula ZA was also tested to ascertain the degree of hydrolysis of the sodium lauryl sulfate (SLS) surfactant over time. The test procedure included measuring SLS concentration in a sample left at ambient temperature (e.g., about 20-25° C.) for 45 days, as compared to the same formulation after incubation at 49° C. for 28 days. The results of such hydrolysis stability testing are shown below in Table 4. As is apparent from the tables above, the target amount of SLS in formula ZA is 350 ppm.

TABLE 4

| Sample | Condition | % SLS |
|---|---|---|
| Formula ZA left on benchtop for 45 days | 45 days at ambient temperature | 0.028% |
| Formula ZA incubated at 120° F (49° C.) for 28 days, then left on benchtop until day 45 | 45 days (28 days at 49° C. and 17 days at ambient temperature) | 0.028% |
| Fresh Formula ZA | T = 0 | 0.032% |
| | T = 28 days at ambient temperature | 0.031% |
| | T = 28 days at 49° C. | 0.028% |

As shown in Table 4, the samples lost about 0.003% SLS (e.g., due to hydrolysis) after storage for 28 days at 49° C. Storage for 28 days at 49° C. is approximately equal to 1 year of storage at ambient temperature.

The additional tables below show further formulations that were prepared, and tested, which illustrate the incompatibility (or compatibility) of various components with the present inventive formulations.

TABLE 5

| Ingredient | Formula A (pH = 2.46) | Formula B (pH = 2.39) | Formula C (pH = 2.45) | Formula D (pH = 2.5) | Formula E (pH = 2.40) |
|---|---|---|---|---|---|
| Water | To 100% | To 100% | To 100% | To 100% | To 100% |
| Citric Acid | 0.6% | 0.6% | 0.6% | 0.6% | 0.6% |
| SLS | 0.44% | 0% | 0.46% | 0.46% | 0% |
| SAS | 0% | 0.46% | 0% | 0% | 0.46% |
| Ammonyx DO | 0.02% | 0% | 0% | 0% | 0% |
| Ethanol | 0% | 0% | 0% | 10% | 0.5% |
| Antimicrobial Efficacy (Staph) | 4:30 min 0/60 | 4:30 min 2/60 | 4:30 min 3/60 | 3:30 min 8/60 | 3:30 min 6/60 |

TABLE 6

| Ingredient | Formula F (pH = 2.16) | Formula G (pH = 1.9) | Formula H-2 (pH = 2.48) | Formula J-2 (pH = 2.35) | Formula K-2 (pH = 2.22) |
|---|---|---|---|---|---|
| Water | To 100% | To 100% | To 100% | To 100% | To 100% |
| Citric Acid | 0.6% | 0.6% | 0.6% | 0.6% | 1% |
| SLS | 0.44% | 0% | 0.0115% | 0% | 0.46% |
| HLAS Biosoft S-101 | 0% | 0.46% | 0% | 0.046% | 0% |
| Ammonyx DO | 0.02% | 0.02% | 0.4485% | 0.414% | 0% |
| MSA | 0.1% | 0% | 0.3% | 0.3% | 0% |
| Antimicrobial Efficacy (Staph) | 3:30 min 3/60 | 3:30 min 1/60 | 4:30 min 60/60 | 4:30 min 60/60 | 4:30 min 1/60<br>3:30 min 0/60 |

TABLE 7

| Ingredient | Formula L (pH = 1.98) | Formula M (pH = 1.8) | Formula N (pH = 2.07) | Formula O (pH = 2.01) | Formula P (pH = 1.9) |
|---|---|---|---|---|---|
| Water | To 100% | To 100% | To 100% | To 100% | To 100% |
| Citric Acid | 0.6% | 0.6% | 0.6% | 0.6% | 0.6% |
| SLS | 0.44% | 0% | 0.0046% | 0% | 0.46% |
| HLAS Biosoft S-101 | 0% | 0.44% | 0% | 0.0115% | 0% |
| Ammonyx DO | 0.02% | 0.02% | 0.4554% | 0.4485% | 0% |

TABLE 7-continued

| Ingredient | Formula L (pH = 1.98) | Formula M (pH = 1.8) | Formula N (pH = 2.07) | Formula O (pH = 2.01) | Formula P (pH = 1.9) |
|---|---|---|---|---|---|
| Dowanol DPNP | 1% | 1% | 0% | 0% | 0% |
| MSA | 0.1% | 0% | 0.45% | 0.45% | 0.1% |
| Antimicrobial Efficacy (Staph) | 3:30 min 1/60 4:30 min 3/60 | 3:30 min 2/60 4:30 min 5/60 | 4:30 min 60/60 | 4:30 min 60/60 | 4:30 min 2/60 |

TABLE 8

| Ingredient | Formula Q (pH = 2.08) | Formula R (pH = 1.81) | Formula S (pH = 2.06) | Formula T (pH = 2.09) | Formula U (pH = 1.98) |
|---|---|---|---|---|---|
| Water | To 100% | To 100% | To 100% | To 100% | To 100% |
| Citric Acid | 0.6% | 0.6% | 0.6% | 0.8% | 0.6% |
| SLS | 0.44% | 0% | 0.46% | 0.46% | 0% |
| SAS | 0% | 0% | 0% | 0% | 0.46% |
| HLAS Biosoft S-101 | 0% | 0.44% | 0% | 0% | 0% |
| Ammonyx DO | 0.02% | 0% | 0% | 0% | 0% |
| Dowanol DPNP | 1.5% | 1.5% | 0% | 0% | 0% |
| MSA | 0.1% | 0% | 0.1% | 0.1% | 0.1% |
| Ethanol | 0% | 0% | 1% | 0% | 0% |
| Antimicrobial Efficacy (Staph) | 3:30 min 2/60 | 3:30 min 3/60 | 3:30 min 6/60 | 4:30 min 0/60 | 4:30 min 2/60 |

TABLE 9

| Ingredient | Formula V (pH = 1.87) | Formula W (pH = 1.98) | Formula X (pH = 2.08) | Formula Y (pH = 1.87) | Formula AB (pH = 1.85) |
|---|---|---|---|---|---|
| Water | To 100% | To 100% | To 100% | To 100% | To 100% |
| Citric Acid | 0.6% | 0.6% | 0.6% | 0.6% | 0.6% |
| SLS | 0% | 0% | 0% | 0% | 0% |
| SAS | 0% | 0% | 0.46% | 0% | 0% |
| HLAS Biosoft S-101 | 0.46% | 0% | 0% | 0.46% | 0.46% |
| Ecosurf EH9 | 0% | 0.46% | 0% | 0% | 0% |
| Tripropylene glycol n-butyl ether | 0% | 0% | 1.173% | 1.173% | 0% |
| MSA | 0% | 0.1% | 0.1% | 0% | 0.1% |
| Dipropylene glycol | 0% | 0% | 1.127% | 1.127% | 1% |
| Octanoic Acid | 0% | 0% | 0% | 0% | 0.01% |
| Antimicrobial Efficacy (Staph) | 4:30 min 4/60 | 4:30 min 60/60 | 4:30 min 12/60 | 4:30 min 13/60 | 4:30 min 11/60 |

TABLE 10

| Ingredient | Formula AD (pH = 1.93) | Formula AE (pH = 2.05) | Formula AF (pH = 1.82) | Formula AG* (pH = 1.79) |
|---|---|---|---|---|
| Water | To 100% | To 100% | To 100% | To 100% |
| Citric Acid | 0.6% | 0.6% | 0.6% | 0.6% |
| SLS | 0% | 0% | 0% | 0% |
| SAS | 0.46% | 0.46% | 0% | 0% |
| HLAS Biosoft S-101 | 0% | 0% | 0.46% | 0.46% |
| Dowanol EPH | 1% | 0% | 0% | 1% |
| Hexylcellosolve | 1.3% | 0% | 1.173% | 1.3% |
| MSA | 0.1% | 0.1% | 0% | 0% |

TABLE 10-continued

| Ingredient | Formula AD (pH = 1.93) | Formula AE (pH = 2.05) | Formula AF (pH = 1.82) | Formula AG* (pH = 1.79) |
|---|---|---|---|---|
| Tripropylene glycol n-butyl ether | 0% | 1% | 1% | 0% |
| Octanoic Acid | 0% | 0% | 0% | 0% |
| Antimicrobial Efficacy (Staph) | 4:30 min 0/60 | 4:30 min 4/60 | 4:30 min 5/60 | 4:30 min 0/60 |

*Formula AG exhibited "floaties" in the composition.

Without departing from the spirit and scope of this invention, one of ordinary skill can make various modifications to the invention to adapt it to various usages and conditions. As such, these changes and modifications are properly, equitably, and intended to be, within the full range of equivalence of the following claims.

The invention claimed is:

1. A hard surface disinfecting composition that has a score of 4 minutes or greater for an EpiOcular assay (ET50) which measures irritancy potential by exposure time required for the composition to reduce tissue viability to 50% of a set of test controls, while providing at least a 3-log reduction in a *Staphylococcus aureus* population within 4 minutes or less, the composition comprising:

(a) about 0.4% to about 1% by weight of citric acid;

(b) about 0.01% to about 1% by weight of an anionic surfactant selected from the group consisting of: alkyl sulfates, alkyl sulfonates, and mixtures or combinations thereof;

(c) about 0.5% to about 4% by weight of one or more non-volatile glycol solvents;

(d) about 0.0001% to about 0.02% by weight of a fatty acid; and (e) water;

wherein a pH of the composition is less than 2.5.

2. The composition of claim 1, wherein the composition includes no additional disinfectant or sanitizer including: other carboxylic acids having 4 or less carbon atoms, quaternary ammonium antimicrobials, biguanides, peroxides, hypochlorites, or bleaching agents.

3. The composition of claim 1, wherein the composition consists of (a)-(e) and a methanesulfonic acid pH adjuster, the composition optionally including one or more adjuvants selected from the group consisting of: fragrances or perfumes, waxes, dyes, colorants, solubilizing materials, stabilizers, thickeners, defoamers, hydrotropes, pH adjusters, buffers, builders, lotions, mineral oils, cloud point modifiers, polymers, preservatives and any combinations or mixtures thereof.

4. The composition of claim 1, wherein the fatty acid comprises from 8 to 18 carbon atoms.

5. The composition of claim 1, wherein the composition is void of glycol ether solvents.

6. The composition of claim 1, wherein the composition further comprises methanesulfonic acid in an amount of up to 1% by weight.

7. The composition of claim 1, wherein the anionic surfactant is selected from the group consisting of alkyl sulfates, secondary alkyl sulfonates, and any combinations or mixtures thereof.

8. The composition of claim 7, wherein the composition comprises the secondary alkyl sulfonate, the alkyl of the secondary alkyl sulfonate having from 6 to 18 carbon atoms.

9. The composition of claim 1, wherein the only surfactant included in the composition is sodium lauryl sulfate.

10. The composition of claim 1, wherein the composition is loaded onto a substrate.

11. The composition of claim 1, wherein total surfactant concentration in the composition is no more than 350 ppm.

12. The composition of claim 1, wherein the composition is safe for use on food contact surfaces and does not necessitate an aqueous rinse of a treated surface.

13. The composition of claim 1, wherein the composition comprises at least 97% water by weight.

* * * * *